US006719374B2

(12) United States Patent
Johnson

(10) Patent No.: US 6,719,374 B2
(45) Date of Patent: Apr. 13, 2004

(54) WHEEL BALANCING DEVICE FOR VEHICULAR WHEELS

(76) Inventor: Dwight David Johnson, 6015 Strome Ct., Dublin, OH (US) 43017

( * ) Notice: Subject to any disclaimer, the term of this patent is extended or adjusted under 35 U.S.C. 154(b) by 0 days.

(21) Appl. No.: 10/206,384

(22) Filed: Jul. 26, 2002

(65) Prior Publication Data

US 2003/0025382 A1 Feb. 6, 2003

Related U.S. Application Data

(60) Provisional application No. 60/310,044, filed on Aug. 6, 2001.

(51) Int. Cl.$^7$ ................................................. F16F 15/22
(52) U.S. Cl. .................................... 301/5.22; 74/573 F
(58) Field of Search ........................... 301/5.21, 5.22, 301/53.5; 73/460; 74/573 R, 573 F; 152/154.1, 381.5, 381.6

(56) References Cited

U.S. PATENT DOCUMENTS

| | | | |
|---|---|---|---|
| 2,123,861 A | * | 7/1938 | Sheilds |
| 2,687,918 A | | 8/1954 | Bell et al. |
| 2,737,420 A | * | 3/1956 | Wilborn |
| 3,017,223 A | | 1/1962 | Morrill |
| RE25,383 E | | 5/1963 | Morrill |
| 3,164,413 A | | 1/1965 | Salathiel |
| 3,191,997 A | * | 6/1965 | Colvert |
| 3,316,021 A | | 4/1967 | Salathiel |
| 3,346,303 A | | 10/1967 | Wesley |
| 3,376,075 A | | 4/1968 | Mithcell |
| 3,377,106 A | * | 4/1968 | Whitlock |
| 3,462,198 A | * | 8/1969 | Onufer |
| 3,464,738 A | * | 9/1969 | Pierce |
| 3,733,923 A | | 5/1973 | Goodrich et al. |
| 3,799,619 A | | 3/1974 | LaBarber |
| 3,913,980 A | | 10/1975 | Cobb, Jr. |
| 3,930,526 A | * | 1/1976 | Edwards |
| 3,953,074 A | | 4/1976 | Cox |
| 4,388,841 A | | 6/1983 | Gamble |
| 4,432,253 A | | 2/1984 | Kerlin |
| 4,674,356 A | | 6/1987 | Kilgore |
| 5,048,367 A | | 9/1991 | Knowles |
| 5,116,106 A | | 5/1992 | Hardesty et al. |
| 5,142,936 A | | 9/1992 | McGale |
| 5,253,928 A | | 10/1993 | Patti |
| 5,503,464 A | | 4/1996 | Collura |
| 6,128,952 A | | 10/2000 | LeBlanc |

FOREIGN PATENT DOCUMENTS

FR        2 375 058        1/1976

* cited by examiner

*Primary Examiner*—Russell D. Stormer
(74) *Attorney, Agent, or Firm*—Flynn, Thiel, Boutell & Tanis, P.C.

(57) ABSTRACT

A wheel balancing device including at least two ballast chambers, each of which defines an interior cavity therein. A movable medium or ballast is contained within each of the interior cavities and is freely movable within the respective ballast chamber. An annular attachment device is provided to secure the ballast chambers to the wheel.

21 Claims, 3 Drawing Sheets

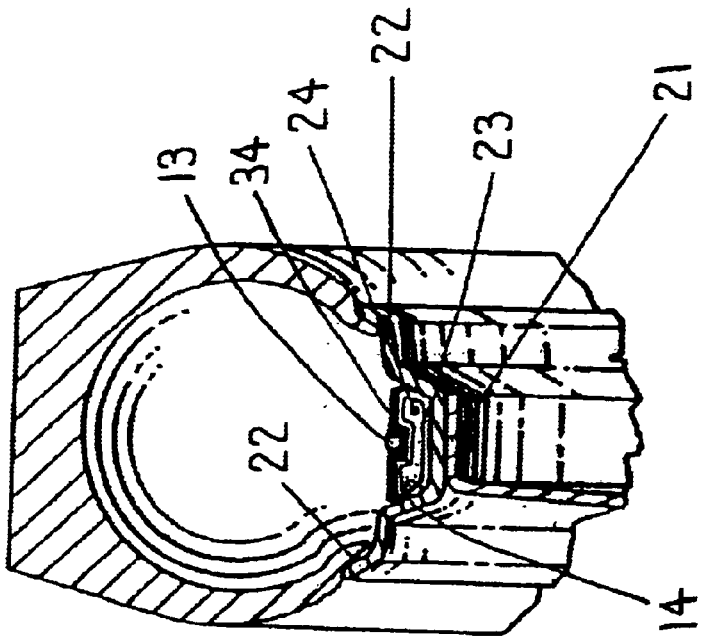
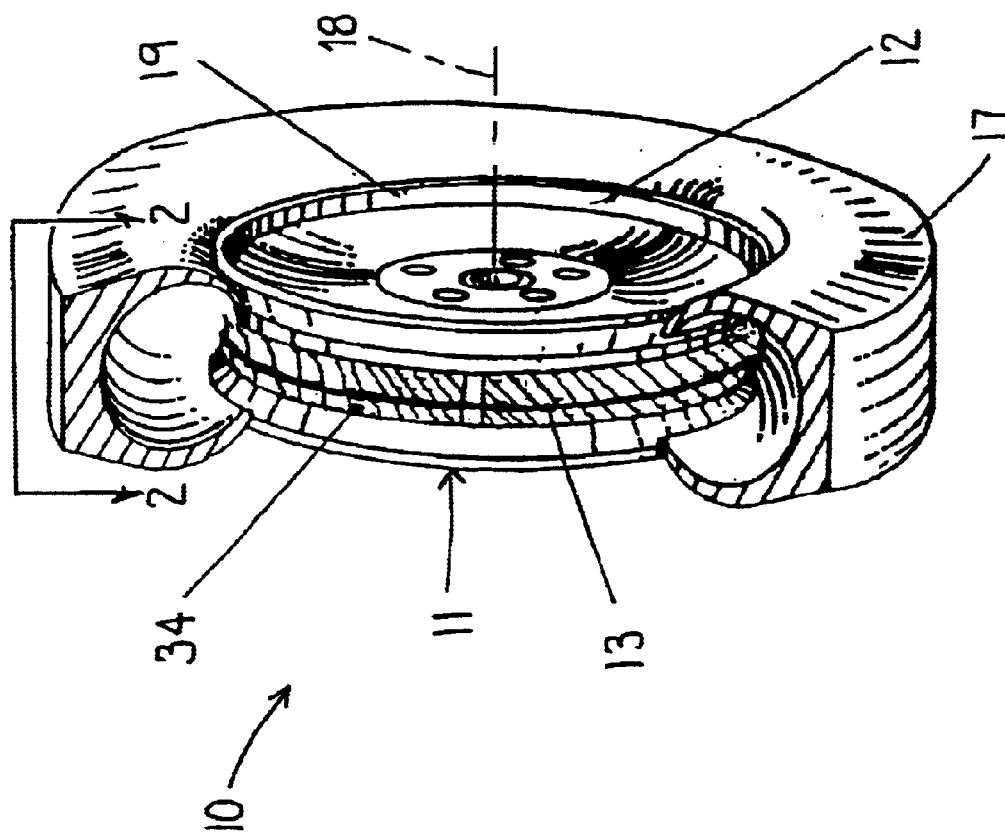

WHEEL BALANCING DEVICE FOR VEHICULAR WHEELS

This application claims priority under 35 USC §119(e) of provisional application Serial No. 60/310,044, filed Aug. 6, 2001, the entire disclosure of which is herein incorporated by reference.

BACKGROUND OF THE INVENTION

Dynamic balancing of rotating objects is known in the prior art. Reference is made to the following patents: U.S. Pat. No. 3,164,413 to Salathiel, U.S. Pat. No. 3,316,021 to Salathiel, U.S. Pat. No. 3,346,303 to Wesley, U.S. Pat. No. 3,376,075 to Mitchell, U.S. Pat. No. 3,733,923 to Goodrich, U.S. Pat. No. 3,799,619 to LaBarber, U.S. Pat. No. 3,913,980 to Cobb, U.S. Pat. No. 3,953,074 to Cox, U.S. Pat. No. 4,388,841 to Gamble, U.S. Pat. No. 4,674,356 to Kilgore, U.S. Pat. No. 5,048,367 to Knowles, U.S. Pat. No. 5,142,936 to McGale, U.S. Pat. No. 5,253,928 to Patti, U.S. Pat. No. 5,503,464 to Collura and U.S. Pat. No. 6,128,952 to LeBlanc describe inventions used to dynamically balance rotating objects, usually vehicle wheels.

U.S. Pat. Nos. 3,164,413 and 3,316,021 to Salathiel describe a hollow annular hoop containing a plurality of spherical weights and a damping fluid. In use, the hoop is attached to a rotating wheel perpendicular to the axis of rotation and concentric to the axis of rotation. The apparatus of the Salathiel patents has the disadvantage of not providing a feasible means of attachment to a vehicular wheel. Furthermore, the Salathiel patents utilize a deformable material for the annular concentricity of the hoop during operation.

U.S. Pat. No. 3,346,303 to Wesley describes a hollow annular hoop containing a plurality of spherical weights and a measured amount of damping fluid. Wesley provides a hoop with an apex at the outer perimeter so as to reduce the area of contact between the spherical weights and the hoop. The hoop is constructed of a metal formed or welded into the proper shape or configuration. The hoop is attached to the wheel of a vehicle by means of attachment to a mounting fixture, which has several precut lug nut holes adapted to fit a wheel.

U.S. Pat. No. 3,376,075 to Mitchell describes a dynamic wheel balancer, which has a hollow annular hoop with a plurality of spherical weights and a damping fluid. The hoop is attached to a mounting fixture, which is adapted to fit a variety of wheel and lug nut configurations. The annular hoop is constructed by attaching a U-shaped channel onto a plate in a fluid tight manner.

U.S. Pat. No. 3,733,923 to Goodrich describes a balancer for rotating masses, which uses an annular hoop, spherical weights, and a damping fluid. The hoop contains a continuous metallic race containing carbon steel balls in a damping fluid. The hoop contains a small section on the interior portion, which is removable for adding the weights and fluid.

U.S. Pat. No. 3,799,619 to LaBarber describes a vibration dampening assembly, which comprises an annular hoop and spherical weights within the hoop. The outer perimeter of the hoop wall is made up of deformable material so as to assist in retaining the spherical weights in position after they have been distributed by the rotating of the hoop.

U.S. Pat. No. 3,913,980 to Cobb for a dynamic wheel balancing apparatus discloses an annular hoop with spherical weights, which is placed around a wheel inside a tire of a vehicle. The invention uses non-metallic weights and a damping fluid. The hoop is made of an elastic material, which can deform in use at high rotational speeds.

The publication Design News described the concept of "Self-Compensating Balancing in Rotating Mechanisms", in an article dated Apr. 28, 1965. Four requirements for successful application of the method for self-compensating balancing are described. First, there must be inertial forces on the rotating system that cause the mass center to misalign with the rotation center of the support bearings. Second, the rotating system must operate far away from its critical or resonant speed. Third, the bearing must have resiliency. Fourth, the rotor must be sufficiently balanced to avoid damage to itself as it passes through its critical speed during start-up.

The prior art does not provide a practical, and effective device or apparatus for realizing the benefits of dynamical balancing for many possible applications, including vehicular wheel balancing. The prior art fails to provide a design with the durability, ease of installation, and broad compatibility with a range of vehicle wheels that is provided by the instant invention. Additionally, the prior art fails to provide a design with a product cost commensurate with the economic benefits provided by dynamical wheel balancing.

SUMMARY OF THE INVENTION

The invention relates to a wheel balancing device having at least two hollow ballast chambers, each defining an interior cavity or compartment. The interior cavities of the respective ballast chambers do not communicate with one another. A movable mass or medium is contained within each of the interior cavities and is freely movable within the respective ballast chamber. An attachment device is provided to secure the ballast chambers to the wheel.

BRIEF DESCRIPTION OF THE DRAWINGS

The features and benefits of this invention will be understood by reference to the following detailed description, as well as by reference to the following drawings, in which:

FIG. 1 is a partial cross-sectional view of a wheel incorporating the wheel balancing device of the present invention;

FIG. 2 is a fragmentary, enlarged cross-sectional view of the wheel of FIG. 1 taken generally along the lines 2—2 in FIG. 1;

DETAILED DESCRIPTION

Figure 3:
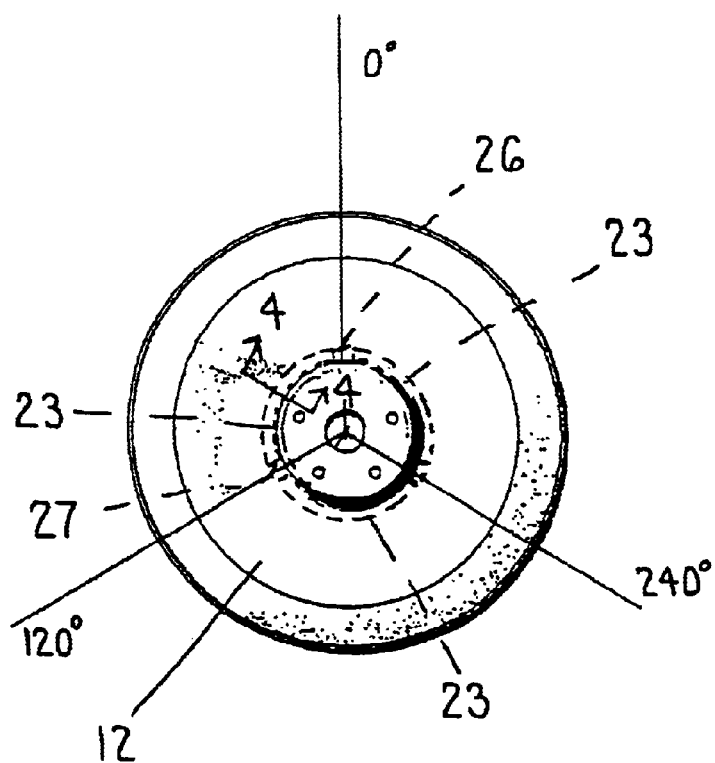
FIG. 3 is a side view of the wheel of FIG. 1.
Figure 5:
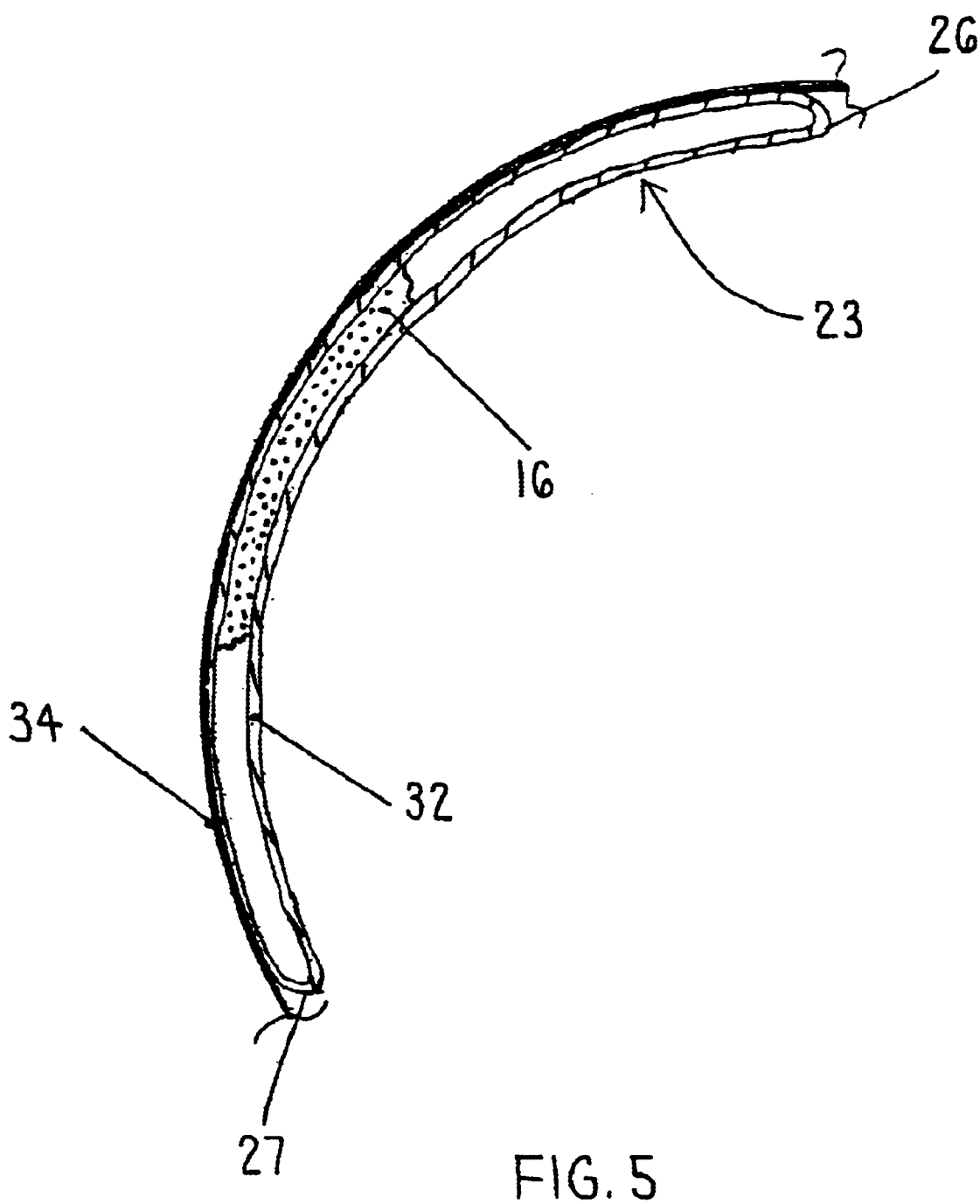
FIG. 5 is a partial vertical cross-sectional view of a ballast chamber.

The wheel balancing device 10 disclosed herein makes use of a novel design, which utilizes a multi-segment, annular construction 11, which is attached to a vehicle wheel 12 by means of a continuous constricting cable, band or strap 13 as shown in FIGS. 1–3. The device 10 is attached inside of an interior longitudinal groove-way 14 of the wheel 12 and contains a movable mass or ballast 16 (FIG. 5) that disperses and re-distributes in reaction to centrifugal and inertial forces acting on the wheel 12 and a tire 17 mounted thereon so as to provide a means for active counterbalancing of the vehicular wheel 12 as it rotates about an axis of rotation 18. The wheel 12 has an outer, tire-holding rim member 19, defined by a generally flat inner portion 21 from which a pair of opposed rims or flanges 22 project upwardly on opposite sides thereof. The upper edges of the rims 22 engage the inner periphery of the tire. The outer rim 19 thus defines therein the groove-way 14 which is generally trough-shaped and faces the interior of the tire 17.

Figure 4:
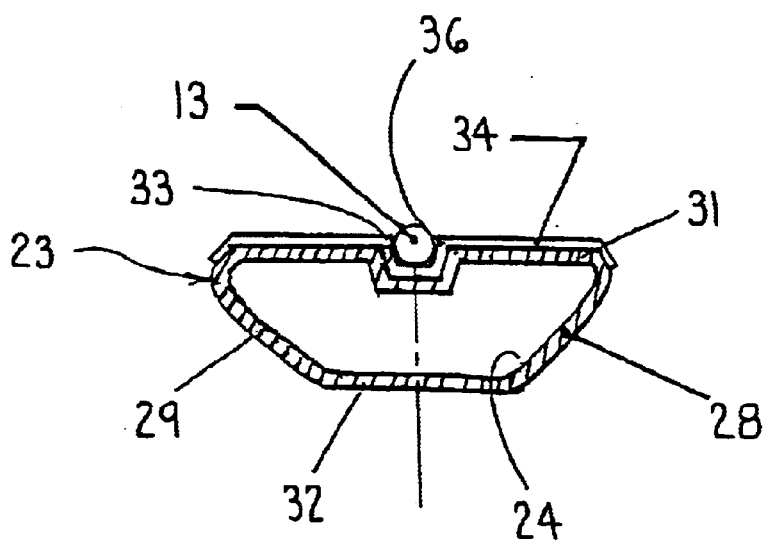
FIG. 4 is an enlarged cross-sectional view of a ballast chamber taken generally along the lines 4—4 in FIG. 3.

The wheel balancing device 10 in its preferred embodiment includes three annular, semi-circular, molded ballast chambers 23 each containing the movable mass or ballast 16, as best illustrated in FIG. 3. Each ballast chamber 23 is elongate and defines a narrow interior cavity or compartment 24 having a transverse cross section which in the illustrated embodiment has a generally frusto-conical shape, as illustrated in FIG. 4. The ballast chambers 23 are molded from a compliant material such as a thermoplastic elastomer so as to conform to the shape of the interior of the internal, longitudinal groove-way 14 when affixed to the wheel 12. Each ballast chamber 23 is defined by two spaced apart end walls 26 and 27 and two contoured angularly oriented side walls 28 and 29. The end walls 26 and 27 are oriented transversely relative to the side walls 28 and 29. Top and bottom walls 31 and 32 are generally parallel to one another and extend between and interconnect the respective side walls 28 and 29. The various walls 26, 27, 28, 29, 31 and 32 of each ballast chamber 23 enclose interior cavity 24. The top wall 31 includes an inwardly projecting channel 33 which extends longitudinally along the top wall 31 near a center thereof. When the wheel balancing device 10 is configured as illustrated, each ballast chamber 23 is sized to extend approximately 120 degrees about the axis of rotation 18 of the wheel 12. In the illustrated embodiment, the channel 33 is defined by the top wall 31 and projects inwardly into the interior cavity 24.

Each ballast chamber 23 is attached to a rigid conduit or plate-like member 34 and affixed to the vehicle wheel 12 by means of the constricting cable 13. Each member 34 is shaped as a thin rectangular strip which has a length approximately equal to that of the corresponding ballast chamber 23. Extending longitudinally generally along the center of each member 34 is an inwardly projecting rib which defines an outwardly opening channel 36. Each ballast chamber 23 is attached to the respective member 34 by mechanical means such as adhesion or heat staking, with the rib of member 34 projecting into the channel 33 of the top wall 31, as discussed further below. Each member 34 holds the respective movable mass 16 and compliant ballast chamber 23 concentric to the spinning wheel 12 during use and provides a structure for attachment to the constricting cable 13. More specifically, the cable 13 is seated within the outwardly opening channels 36 of the respective members 34 and extends about the periphery thereof.

In the preferred configuration, the wheel balancing device 10 in its assembled state contains three ballast chambers 23, three rigid members 34 and a single constricting cable or band 13. The interior cavity 24 of each ballast chamber 23 is partially filled with the movable mass material 16, such as sand. The movable mass could also be a suitable damping fluid, such as oil or liquid mercury. It will be appreciated that any suitable method for partially filling the ballast chambers 23 with the movable mass 16 may be utilized. For instance, the ballast chambers 23 can be molded so that one or both ends are open. A first end cap can be attached to one end of the respective ballast chamber 23 to form the end wall 26. The sand 16 or other movable mass can then be added to the ballast chamber 23. A second end cap can then be attached to the other end of the respective ballast chamber 23 to form the end wall 27. In this regard, particular attention should be paid to ensure that the ends of the ballast chamber 23 remain sealed during operation so the movable mass 16 contained therein does not escape the interior cavity 24. While this is one method of filling and assembling the ballast chambers 23, it should be appreciated that any suitable method could be used.

Once the ballast chambers 23 are filled and assembled, a plate-like member 34 is positioned atop each ballast chamber 23 so the rib of member 34 which defines channel 36 is received in the associated channel 33 of the top wall 31. The members 34 are then affixed to the respective ballast chambers 23, such as by one of the mechanical means set forth above. The ballast chambers 23 are now ready for installation on the wheel 12.

The ballast chambers 23 are attached to the wheel 12 after the air valve of the wheel is in place. Installation is performed by placing the ballast chambers 23 in the groove-way 14 of the wheel 12 and wrapping the cable 13 around the ballast chambers so that it extends within the channel 36 of each member 34. The cable 13 is then constricted, such as with the use of a tightening tool and an off-the-shelf cable attachment component to secure the free ends of the cable 13 to one another After installation, the constricting cable 13 is held in constant tension by the pressure provided by the pressurized wheel ballast chambers 23 that conform to the shape of the internal longitudinal groove-way 14 of the wheel 12 as the constricting cable 13 is tightened. Clearance for tire installation is provided as the wheel balancing device 10 is located inside of the recessed groove-way 14 of the wheel 12 and inside the tire 17, once same is installed on wheel 12, as shown in FIG. 1, and thus does not interfere with tire placement about the wheel 12.

Because the wheel balancing device 10 is comprised of multiple, semi-circular, annular segments, the device does not exhibit the adverse transient behavior that previously known automatic wheel balance devices have shown. That is, during vehicle acceleration and deceleration, the wheel balancing device 10 of the present invention is able to produce the desired counterbalancing effect much more rapidly than previously known wheel balancing products.

Because the present wheel balancing device 10 is attached around the innermost annular recess of a vehicular wheel, an inherent benefit that the wheel balancing device 10 provides is compatibility with a broad range of vehicles within a standard tire size. That is, within each vehicle category (i.e. commercial trucks having 20", 19", . . . 13" wheels), a standard wheel balancing device according to this invention can be produced to be compatible with all vehicles regardless of vehicle make or model year. The positive network externality afforded by the present design provides it with a strong competitive advantage over competitors.

The wheel balancing device 10 maintains a wheel/tire in dynamic balance throughout the lifetime of the wheel, which may include several sets of tires. The wheel balancing device 10 minimizes the net shaking force produced by each wheel/tire by actively counterbalancing the imbalances of the tire to provide a smoother, more fuel efficient ride, which also extends the life of tires, suspension components, and steering components by reducing vibration. The wheel balancing device 10 not only provides increased passenger comfort, but also provides improved handling and safety, since wheel imbalance lengthens braking distances and adversely affects cornering ability, particularly in wet conditions. Commercialization and widespread use of the wheel balancing device 10 will have a dramatic impact on the environment through improved fuel efficiency and; reduced rate of consumption of vehicle tires.

It should be appreciated that the foregoing description is for the purposes of illustration only, and alternative embodiments of this invention are possible without departing from the scope of the invention. For instance, while the wheel balancing device has been illustrated herein including a number of rigid conduits equal to the number of ballast chambers, a single conduit could be substituted. In this configuration, the single conduit could wrap around all of the ballast chambers and be tightly secured in place by a suitable locking means. In addition, the attachment device used in the wheel ballast device could be any suitable means other than the constricting cable which secures the ballast chambers together and snug against the wheel. Further, while three ballast chambers have been illustrated, the wheel ballast device of the present invention could include any suitable number of separate chambers.

Although particular preferred embodiments of the present invention have been disclosed in detail for illustrative purposes, it will be recognized that variations or modifications lie within the scope of the present invention and do not depart from the spirit of the invention, as set forth in the foregoing description and drawings, and in the following claims.

What is claimed is:

1. A combination vehicle wheel and balancing device, said combination comprising:
    a vehicle wheel defining an axis of rotation and a tire holding outer rim member defining therein a longitudinal groove which opens outwardly and extends circumferentially about said wheel about the axis thereof; and
    a balancing arrangement including a plurality of balancing members each defined by a chamber structure secured within said groove of said wheel, each said chamber structure defining an interior cavity which is closed such that said chamber structures do not communicate with one another, each said cavity containing a mass which is freely movable within the respective cavity, said balancing members being the sole members for balancing the wheel, said balancing arrangement further including an elongate and continuous strap which is constricted about and circumferentially surrounds said chamber structures to secure same to said wheel.

2. The combination of claim 1 wherein said chamber structures surround substantially the entire circumference of said outer rim member.

3. The combination of claim 2 wherein said chamber structures are provided about said circumference of said wheel in end-to-end relation with one another so as to together define an annular configuration which surrounds said outer rim member.

4. The combination of claim 1 wherein said outer rim member includes a pair of flanges which are disposed in opposed and spaced-apart relation with one another, and an inner portion which extends transversely between said flanges, wherein inwardly facing surfaces of said flanges and an outwardly facing surface of said inner portion together define said groove.

5. The combination of claim 4 wherein said vehicle wheel further includes a tire which circumferentially surrounds and is fixed to said outer rim member, said chamber structures being disposed within an interior portion of said tire.

6. The combination of claim 1 wherein each said chamber structure defines therein a longitudinally extending and outwardly opening channel, said channels of said chamber structures being aligned in end-to-end relation with one another about the circumference of said wheel, said strap being disposed within the respective channels and being constricted about said chamber structures.

7. The combination of claim 6 wherein a rigid plate-like member extends along and is secured to an outer surface of each said chamber structure, said channels being defined in the respective plate-like members.

8. The combination of claim 1 wherein said chamber structures are molded from a thermoplastic elastomer.

9. The combination of claim 1 wherein said balancing members are separate and distinct components positioned circumferentially about said wheel.

10. A wheel-balancing kit for installation on a vehicle wheel having an outer tire-engaging rim defining therein a circumferentially extending and outwardly opening groove, said kit comprising:
    a plurality of elongate chamber structures each defining therein a closed cavity containing a freely movable mass, each said chamber structure having an outer wall which defines therein a longitudinally extending channel; and
    an elongate and annular strap for securing said chamber structures within the groove of the wheel in an end-to-end manner with one another such that said chamber structures extend circumferentially about the wheel and said strap is engaged within said channels of each of said chamber structures.

11. The wheel-balancing kit of claim 10 wherein said strap is tensioned about said chamber structures to secure same to the wheel.

12. The wheel-balancing kit of claim 11 wherein each said chamber structure is constructed of an elastomeric material and is generally frusto-conical in shape in transverse cross-section for conforming engagement within the groove of the tire-engaging rim.

13. The wheel-balancing kit of claim 12 wherein each said chamber structure mounts thereon a rigid plate-shaped member on said outer wall thereof which defines the respective channel therein.

14. A vehicle wheel comprising:
    a rim having an outer peripherally extending surface for mounting a tire thereon, said surface defining therein an inwardly projecting and outwardly opening groove which faces towards an interior portion of the tire when mounted on said rim; and
    a balancing assembly including a plurality of separate and elongate chamber structures constructed of an elastomeric material and each defining therein a hollow interior partially filled with a balancing medium, said chamber structures being disposed in an end-to-end manner with one another within said groove so as to substantially peripherally surround said rim, and an annular and continuous strap disposed along outer surfaces of the respective chamber structures in surrounding relation therewith, said strap being tensioned about said chamber structures to secure same to said wheel.

15. The vehicle wheel of claim 14 wherein said hollow interiors of said chamber structures are closed and do not communicate with one another.

16. The vehicle wheel of claim 14 further including a tire engaged with said outer surface of said rim, said balancing assembly being disposed within an interior of said tire.

17. The vehicle wheel of claim 14 wherein each said chamber structure defines therein an outwardly opening recess, said recesses of the respective chamber structures being longitudinally aligned with one another to define a substantially continuous annular recess in which said strap is disposed.

18. A wheel-balancing kit for use on a wheel including a rim defining a circumferentially extending tire-engaging portion, said kit comprising a plurality of chambers for positioning circumferentially about the tire-engaging portion of the wheel, each said chamber defining therein a closed cavity containing a freely movable mass, and a tensioned strap disposed peripherally about said chambers to secure said chambers to the wheel.

19. The wheel-balancing kit of claim 18 wherein said chambers are elongate in shape and are disposed in end-to-end relation with one another about the tire-engaging rim.

20. The wheel-balancing kit of claim 18 wherein said kit includes three of said chambers for positioning circumferentially about the tire-engaging rim and inside a tire mounted thereon.

21. The wheel-balancing kit of claim 18 wherein said chambers are constructed of elastomeric material, and a rigid plate defining an elongate and outwardly opening channel therein is disposed along an outer wall of each said chamber, said channels being longitudinally aligned with one another about the circumference of the wheel and said strap being engaged within the respective channels.

* * * * *